United States Patent [19]

Ruetman et al.

[11] Patent Number: 4,920,167

[45] Date of Patent: Apr. 24, 1990

[54] ANTISTATIC POLYURETHANE-UREA DISPERSIONS

[75] Inventors: Sven H. Ruetman, Walnut Creek; Joginder N. Anand, Clayton; G. Robert Collins, Walnut Creek, all of Calif.

[73] Assignee: The Dow Chemical Company, Midland, Mich.

[21] Appl. No.: 269,506

[22] Filed: Nov. 10, 1988

[51] Int. Cl.$^5$ .............................................. C08G 18/06
[52] U.S. Cl. ..................................... 524/155; 524/165; 524/174; 524/183; 524/184; 524/280; 524/361; 524/364; 524/376; 524/377; 524/392; 524/394; 524/404; 524/406; 524/408; 524/413; 524/414; 524/418; 524/421; 524/423; 524/424; 524/429; 524/434; 524/435; 524/436; 524/437; 524/438; 524/590; 524/591

[58] Field of Search ............... 524/591, 839, 184, 404, 524/421, 701, 746, 361, 364, 590, 376, 377, 770, 761, 762, 706, 723, 729, 742, 745, 773, 779, 796, 155–174, 183, 280, 392, 394

[56] References Cited

U.S. PATENT DOCUMENTS

| | | | |
|---|---|---|---|
| 4,618,630 | 10/1986 | Knobel et al. | 521/105 |
| 4,622,360 | 11/1986 | Gomi et al. | 524/507 |
| 4,701,480 | 10/1987 | Markusch et al. | 523/340 |
| 4,745,151 | 5/1988 | Noll et al. | 524/591 |
| 4,806,571 | 2/1989 | Knobel et al. | 521/107 |

*Primary Examiner*—Maurice J. Welsh
*Assistant Examiner*—Rabon Sergent

[57] ABSTRACT

Disclosed is dispersion of a polyurethane-urea polymer in a continuous phase. This dispersion contains about 0.1 to about 5 parts by weight of an ionizable, non-volatile salt per 100 parts by weight of polyurethane-urea polymer. Polyurethane-urea coatings made from this dispersion have excellent static dissipative properties.

17 Claims, No Drawings

ANTISTATIC POLYURETHANE-UREA DISPERSIONS

BACKGROUND OF THE INVENTION

This invention relates to polyurethane-urea dispersions, and to polyurethane-urea polymers prepared therefrom.

Dispersions of polyurethane-ureas polymers are well known to be useful in preparing coatings of various types. These coatings are generally characterized in having excellent chemical resistance, abrasion resistance, toughness and other desirable properties.

These dispersions generally comprise a continuous phase, preferably aqueous but sometimes consisting of organic compounds, in which a polyurethane-urea polymer is dissolved or dispersed as a plurality of small particles. The polyurethane-urea polymer is generally the reaction product of an amine curing agent and an isocyanate-terminated prepolymer. The prepolymer is generally a reaction product of a relatively high equivalent weight polyol and a polyisocyanate. Sometimes the the prepolymer is modified to contain ionic groups in order to improve its dispersability in the continuous phase.

Although these dispersions provide otherwise excellent coatings, in some applications it is desirable to provide a coating which is electroconductive or static dissipative. Conventional polyurethane-urea coatings, despite the presence of ionic groups, have not proven sufficiently static dissipative to meet this requirement.

Because of the nature of polyurethane-urea coatings conventional antistatic agents are either not suitable, or are prohibitively expensive. Electroconductive fillers and fibers, which are often used in preparing bulk polymers, cannot be practically incorporated into coatings. Topical antistatic agents must be applied in an additional manufacturing step after the coating is applied and cured, which substantially increases manufacturing costs. Moreover, these topical additives are humidity dependent and tend to wear off during use. Other antistatic agents often are useful only in large quantities, which often causes the coating to lose important physical properties.

It is therefore desirable to provide a polyurethane-urea dispersion which is useful to form a static dissipative coating.

SUMMARY OF THE INVENTION

In one aspect, this invention is a dispersion of a polyurethane-urea polymer in a continuous phase, said dispersion containing about 0.1 to about 5 parts by weight of an ionizable, non-volatile salt per 100 parts by weight of polyurethane-urea polymer.

In another aspect, this invention is a coated substrate having a static dissipative coating comprising a polyurethane-urea polymer having dispersed therein from about 0.1 to about 5 parts, per 100 parts by weight polymer, of an ionizable, non-volatile salt.

In yet another aspect, this invention is a polyurethane-urea polymer prepared by coalescing the dispersion of this invention.

This invention provides for polyurethane-urea coatings having desirable physical properties, with the further advantage of being static dissipative. The static dissipative nature of this coating is largely humidity independent, and largely constant over time. Thus such advantages may be obtained with the use of a salt as described herein is quite unexpected, as the salt would ordinarily be expected to interact with the continuous phase, particularly when water or a polar organic continuous phase is used. Nonetheless, stable dispersions as useful solids levels are obtained with this invention, and the coatings coalesced therefrom exhibit good physical and static dissipative properties.

DETAILED DESCRIPTION OF THE INVENTION

The dispersion used in this invention is characterized in having a continuous phase in which is dispersed a polyurethane-urea polymer. By "dispersed", it is meant that the polymer is either dissolved in the continuous phase, or is present therein as a plurality of individual particles. The term "dispersion" is therefore used broadly herein to denote solutions, emulsions or suspensions of the polyurethane-urea polymer in the continuous phase. Suitable polyurethane-urea polymer dispersions are described, for example, in *Angewante Chemie Intn'l. Ed* 9, pp. 40 to 50 (1970); *Progress In Organic Coatings* 9 (1981), pp. 218 to 340, U.S. Pat. Nos. 3,870,684; 4,203,883; 4,408,008 and 4,501,852; all incorporated herein by reference.

The continuous phase is any liquid (a) in which the polyurethane-urea polymer can be dispersed or dissolved and (b) which can be readily removed from the polyurethane-urea polymer by evaporation at a temperature below that at which the polyurethane-urea polymer undergoes substantial degradation. Preferably, the continuous phase comprises a relatively low molecular weight organic compound such as, e.g., acetone, methyl ethyl ketone, toluene, xylene, glycol ethers and the like. More preferably, the continuous phase comprises water or a mixture of water and a minor quantity of one of the aforementioned organic compounds. Most preferably, the continuous phase comprises at least about 90% by weight water, exclusive of any dissolved polyurethane-urea polymer.

The polyurethane-urea polymer is any which can be dispersed or formed as a dispersion in the continuous phase, and which has properties useful in coating applications. Advantageously, the polyurethane-urea polymer is the reaction product of at least one relatively high equivalent weight isocyanate-reactive material, a polyisocyanate, and an amine curing agent. Preferably, the polyurethane-urea polymer is prepared by curing, with a polyamine curing agent, a prepolymer which is itself the reaction product of a mixture comprising a relatively high equivalent weight polyol, a polyisocyanate, and optionally a polyol containing an ionic or potential ionic group, as defined below. Suitable such preferred polyurethane-urea polymers are described in the publications and patents cited before.

As mentioned before, the prepolymer is preferably a reaction product of a mixture comprising a relatively high equivalent weight polyol and a polyisocyanate. The relatively high equivalent weight polyol preferably includes a diol, i.e. a compound having an average of about 1.7 to about 2.1 hydroxyl groups per molecule. The relatively high equivalent weight polyol may also include minor portions of a triol, i.e. a compound having an average of about 2.3 to about 3.1 hydroxyl groups per molecule, as taught in the copending application of Ruetman et al., Ser. No. 200,287, filed May 31, 1988, incorporated herein by reference. The use of this triol has been found to provide certain physical property improvements. In addition, the use of a minor quantity of amine-terminated high equivalent weight compounds is also contemplated by this invention.

By "relatively high equivalent weight", it is meant that the polyol has an equivalent weight from about 300 to about 6,000, preferably about 500 to about 3000, more preferably about 1000 to about 2500.

The polyols useful herein include polyether polyols, polyester polyols, hydroxyl-terminated polycarbonates, hydroxyl-terminated polybutadienes, hydroxyl-terminated polybutadiene-acrylonitrile copolymers and hydroxyl-terminated copolymers of dialkyl siloxane and alkylene oxides such as ethylene oxide, propylene oxide and the like. Preferred are polyethers such as polyoxyethylene polyols, polyoxypropylene polyols, polyoxybutylene polyols, polytetramethylene oxide polymers, random and block copolymers of ethylene oxide, propylene oxide and butylene oxide and random and block copolymers of tetrahydrofuran and ethylene oxide and-/or propylene oxide. The most preferred polyether polyols are random and block copolymers of ethylene and propylene oxide, and polytetramethylene oxide polymers.

An especially preferred composition for use as the relatively high equivalent weight polyol component comprises about 50–99 equivalent percent of a polyether diol and about 1–50 equivalent percent of a polyether triol, wherein both the diol and triol are polymers of ethylene oxide, propylene oxide, butylene oxide, tetramethylene oxide, or mixtures thereof.

The polyisocyanate used in preparing the prepolymer advantageously has an average functionality of about 2.5 or less, preferably about 2.0, since this lower functionality reduces crosslinking, which in turn favors stability of the dispersion. Aromatic polyisocyanates such as toluene diisocyanate and diphenylmethanediisocyanate can be used, but the aliphatic polyisocyanates are preferred on the basis of their generally better light stability and slower reactivity. Suitable such aliphatic polyisocyanates include 1,6-hexamethylene diisocyanate, 1,7-heptamethylene diisocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2,4-trimethylhexamethylene diisocyanate, 2,4,4-trimethylhexamethylene diisocyanate, and the (3-isocyanatopropoxy)-(3-isocyanatopropyl)arylenes such as 1-(3-isocyanatopropoxy)-4-(3-isocyanatopropyl)benzene described in U.S. Pat. No. 4,051,166, 1,4-bis(2-isocyanatoethyl)cyclohexane, and the like; isophorone diisocyanate otherwise identified as 1-isocyanato-3-isocyanatomethyl-3,5,5-trimethylcyclohexane; and cycloaliphatic diisocyanates such as methylenebis(cyclohexyl isocyanate) including the 4,4'-isomer, the 2,4'-isomer, and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, 1,4-diisocyanatocycloheptylene, 1,4-diisocyanatocyclooctylene, and the like.

In preparing the prepolymer, particularly when an aqueous continuous phase is contemplated, it is also desirable to employ a polyol containing anionic or potentially ionic group. The term "ionic group or potential ionic group" means a group either already in an anionic or cationic form or one which is readily converted to said anionic or cationic form. For example, acid groups and amine groups can readily be converted to anionic or cationic form, respectively, by neutralization. Tertiary amine can be converted to cationic form by alkylation as well. Illustrative of such potential anionic groups (and their respective neutralized forms) are $-COOH(-COO^\ominus)$, $-SO_2OH(-SO_2O^\ominus)$, and $=POOH$ ($=POO^\ominus$); illustrative of such potential cationic groups (and neutralized form) are $\equiv N$ ($\equiv N-\oplus$), $\equiv P$ ($\equiv P-\oplus$), and $=S$ ($=S-\oplus$). Suitable such polyols are described in Ser. No. 200,287. Preferred such polyols are dihydroxy alkanoic acids such as are described in U.S. Pat. No. 3,412,054. Most preferred are $\alpha,\alpha$-dimethylol alkanoic acids having the formula $QC(CH_2OH)_2COOH$ wherein Q is hydrogen or $C_1$ to $C_8$ alkyl (preferred are those acids with $C_1$ to $C_4$) which are neutralized with aliphatic $C_2$ to $C_4$ tertiary amines such as triethylamine, tripropylamine, tributylamine, triisopropylamine, and the like, and aqueous or anhydrous ammonia. An especially preferred embodiment of the present invention is when the carboxylic acid group is neutralized with the amine after said prepolymer formation and prior to forming an aqueous dispersion thereof. This polyol is advantageously used in an amount which provides the prepolymer with about 10 to about 150, preferably about 20 to about 100 milliequivalents of ionic groups per 100 grams of prepolymer.

A prepolymer can be formed from the polyol, ionic group containing polyol (if any) and a stoichiometric excess of the polyisocyanate in any convenient manner. It is preferred that the prepolymer be formed in the substantial absence of moisture, and for that reason, prior to dispersing the components in an aqueous continuous phase. The amount of polyisocyanate employed is generally sufficient to provide the prepolymer with a free —NCO content of about 1 to about 15%, preferably about 2 to about 12% by weight. A ratio of about 1.1 to about 3, preferably about 1.2 to about 2 equivalents of polyisocyanate per equivalent of polyol(s) generally provides a prepolymer having the desired —NCO content.

An elevated temperature is advantageously used in forming the prepolymer, and the substantial absence of a catalyst is preferred, although not mandatory. The temperature used should be sufficient to provide a commercially acceptable reaction rate, but should be below a temperature at which substantial degradation of the prepolymer or raw materials occurs. A temperature of about 30° to about 150° C. is useful. The prepolymer can be formed in the presence of solvents or diluents which do not react with the raw materials, but it is preferred to conduct the reaction neat.

As stated before, it is preferred to neutralize the ionic group-containing polyol after formation of the prepolymers. This is conveniently done by adding the neutralizing agent to the prepolymer with agitation in an amount sufficient to neutralize at least about 75 percent, preferably at least about 90 percent of the ionic groups.

The resulting prepolymer, if prepared neat, is then advantageously dispersed in the continuous phase. When an aqueous continuous phase is used, this dispersion is achieved by simply mixing the prepolymer into the aqueous phase with rapid agitation. It is normally preferred to use the continuous phase and prepolymer in proportions which yield a concentration of prepolymer from about 10 to about 50, more preferably about 20 to about 40, weight percent, based on weight of the prepolymer dispersion.

Following formation of the prepolymer dispersion, the prepolymer is reacted with the amine curing agent to produce the polyurethane-urea dispersion. This step is preferably performed relatively promptly after forming the prepolymer dispersion, as the prepolymer dispersion is usually not particularly stable. The addition of amine curing agent can be done by adding the curing agent neat, or by dissolving the curing agent in a suitable solvent and mixing the curing agent solution with the prepolymer dispersion. In either case, the mixing of prepolymer and curing agent is done under conditions of rapid agitation.

Due to the great reactivity of the curing agent with the prepolymer, the reaction proceeds rapidly at moderate temperatures. Thus, it is usually not necessary to heat the reactants, and in some cases it may be preferred to cool the components below room temperature before mixing. Preferably, the reaction is conducted at a temperature of about 5° to about 90° C., more preferably about 20° to about 60° C.

The preferred curing agents are hydrocarbon polyamines. The amine groups can be primary or secondary or a mixture of both in the same molecule. Preferably the amine functionality falls within a range of from about 2 to about 4, including average values within this range arising from mixtures of polyamines. Preferred as a class are the hydrocarbon diamines wherein the amine functions are primary.

Illustrative polyamines are ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 2,2,4-trimethylhexamethylenediamine-1,6, 2,4,4-trimethylhexamethylenediamine-1,6, diethylene triamine, triethylene tetramine, iminobispropylamine, and the like; 1,2-cyclohexylenediamine, 1,3-cyclohexylenediamine, 1,4-cyclohexylenediamine, 4,4'-isopropylidenebis(cyclohexyl amine), 4,4'-diaminodicyclohexyl, methylenebis(cyclohexylamine) including the 4,4'-isomer, the 2,4'-isomer and mixtures thereof including all their geometric isomers, 1-amino-3-aminomethyl-3,5,5-trimethylcyclohexane, and the like; 1,3-phenylenediamine, 1,4-phenylenediamine, 2,4-toluenediamine, 2,6-toluenediamine, 4,4'-methylenebis(phenyl amine), 2,4'-methylenebis(phenyl amine), 4,4'-diaminobenzidine, 3,3'-diaminobenzidine, polymethylene polyphenylene amines, and the like.

More preferred as a class of curing agents are those falling within the alkylene diamines, most particularly the alkylene diamines of $C_2$ to $C_8$ as exemplified above.

The proportion of curing agent is governed by the isocyanate content of the prepolymer component. Generally speaking, the amount of curing agent is such that the ratio of isocyanate groups in the prepolymer to amine groups in the curing agent falls in a range of from about 1.25 to about 0.90, and, preferably from about 1.10 to 0.95.

In this invention, an ionizable, non-volatile salt is employed in the dispersion to render polymers prepared therefrom static dissipative. For the purpose of this invention, an ionizable salt is defined as a salt containing at least one metal cation which is in ionic association with at least one anion, and the ions in the presence of an electric field can be mobile. The cation can be any metal which forms an ionizable salt with one or more anions, including those metals in Row 2, Groups 1(a) and 2(a); Row 3, Groups 1(a), 2(a) and 3(a); Row 4, Groups 1(a) to 4(a) and 1(b) to 8(b); Rows 5 and 6, Groups 1(a) to 5(a) and 1(b) to 8(b) of the Periodic Table of the Elements. Preferably, the metal is an alkali metal, an alkaline earth metal, cobalt, nickel, iron, copper, cadmium, zinc, tin, aluminum or silver.

The anion is any which forms an ionizable salt with the metal cation. The anion is advantageously the conjugate base of an inorganic acid, a $C_2$-$C_4$ carboxylic acid or a tetraorganoboron ion. Suitable anions include for example the halides, i.e. fluoride, chloride, bromide and iodide; nitrate, thiocyanate, sulfate, hydrogen sulfate, sulfite, hydrogen sulfite, chlorite, carbonate, phosphate, hydrogen phosphate, dihydrogen phosphate, phosphite, hydrogen phosphite, dihydrogen phosphite, trifluoromethane sulfite, acetate, tetraorganoboron, particularly tetraalkyl and tetraphenyl boron fluorinated alkyl sulfonates and the like. Of these, salts containing the anions tetraorganoborons, thiocyanates, fluorinated alkyl sulfonates and acetates are preferred on the basis of generally better performance and lower corrosion. Most preferred are the thiocyanate anion, $C_1$-$C_4$ perfluorinated alkyl sulfonate ions and the tetraphenyl boron anion, which are less reactive with metals, water or other materials which are often present in the polymer or in the formation of the polymer. The most preferred salts are sodium and potassium tetraphenyl boron salt and sodium and potassium triflate (trifluoromethylsulfonate).

The salt is employed in an amount which measurably improves the static dissipative properties of the polyurethane-urea polymer. However, it is desirable to use a minimal amount of salt in order to minimize the deterioration in physical properties and increase in moisture sensitivity which occurs when excess amounts of salt are used. Advantageously, about 0.05 to about 5, preferably about 0.1 to about 2 parts by weight salt per 100 parts by weight polymer are sufficient to provide desirable static dissipative properties. One surprising aspect of this invention is that with the polyurethane-urea polymer, especially one containing neutralized ionic groups, exceptionally good static dissipative properties are obtained with minimal amounts of salt.

The salt can be incorporated into the prepolymer prior to dispersing same in the continuous phase, or by adding it to the dispersion at any convenient point in the process, but preferably after neutralization of the ionic groups, if any.

As discussed in U.S. Pat. Nos. 4,617,325 and 4,618,630, certain carboxylic acid esters and phosphate esters are known to be useful as "enhancer" compounds in preparing antistatic polymers using ionizable salts. In this invention it has been found that such enhancers are normally not necessary due to the surprisingly good static dissipative properties obtained in their absence. Accordingly, it is preferred that the polyurethane-urea polymer be essentially devoid of such compounds, i.e. that it contain less than about 0.5 mole of such enhancer compound per mole of salt, more preferably less than about 0.05 mole of such enhancer compound per mole of salt.

The static dissipative properties of the polymer are conveniently measured according to the method described in MIL-B-81705B, Federal Method Standard 101C, Method 4046.1. The polymer advantageously dissipates 90% of an applied 5000 volt (DC) charge in less than 2 seconds, preferably less than one second, more preferably less than 0.5 second, and most preferably less than 0.25 second.

In addition to the foregoing components, additives such as colorants, antioxidants, UV stabilizers, fillers, flame retardants, preservatives, surfactants, adhesion promoters and the like may be used, if desired.

The dispersion of this invention is useful in preparing static dissipative coatings, films, membranes and the like. Such as readily prepared in known manner for the dispersion of this invention by applying same to a convenient substrate and removing the continuous phase. Subsequent curing is not normally necessary, although it may be desirable to subject the polymer to an elevated temperature in order to drive off residual amounts of the continuous phase. Suitable techniques for preparing films and coating are described in copending application Ser. No. 200,287, filed May 31, 1988, incorporated by reference. Typical films, membranes and coatings have a thickness from about 0.1 to about 50 mils.

The dispersion of this invention is of particular interest in providing static dissipative coatings for a variety of substrates, of which electronic packaging is of particular importance. Other important uses include in preparing antistatic coatings for conveyor and drive belts, coatings for flammable materials packaging and handling devices, preparing antistatic footwear, coatings for materials used in dust-free environments, and the like. Antistatic lacquers and printing aids are another important use of this invention.

An especially important use of this dispersion is in preparing static dissipative coatings for thermoplastic films The coated films are useful in making wrappings, bags and other packaging materials for electronics components. The coated films can also contain a metal layer to further improve its conductivity.

ILLUSTRATIVE EMBODIMENTS

The following examples are provided to illustrate the invention and are not intended to limit the scope thereof. Unless stated otherwise, all parts and percentages are given by weight.

EXAMPLE 1

In a suitable vessel are added 6.8 parts of 2,2-bis(hydroxymethyl)-propionic acid, 100 parts of a 2000 molecular weight, nominally difunctional ethylene oxide-capped poly(propylene oxide) and 40 parts of $H_{12}$-methylene diphenyldiisocyanate ($H_{12}MDI$). This mixture is stirred under a nitrogen atmosphere at 100° C. for two hours. It is then cooled to 70° C. and 0.47 parts of octadecyl-3,5-di-t-butyl-4-hydroxyhydrocinnamate (a stabilizer) is added. After about five minutes stirring, 1.6 parts of sodium tetraphenyl boron is added. After another five minutes stirring, 4.9 parts triethylamine is added and the stirring continued for additional 20 minutes at 70° C., after which time an opaque, viscous resin is obtained. With rapid agitation, 350 parts of water are added to form a dispersion, and then a solution of 3 parts of ethylenediamine in 50 parts of water is added with rapid agitation. An additional 50 parts of water is used to rinse the ethylenediamine container and is added to the dispersion. The resulting dispersion is stirred for 60 minutes at ambient temperate. It has a pH of 9 and contains 25.4% solids by weight. This dispersion is referred to as Sample No. 1.

Dispersion Sample No. 2 is made in the same manner, except the sodium tetraphenyl boron is added after the ethylenediamine is added and permitted to react.

Comparative Sample A is prepared in the same manner as Example No. 1, except the sodium tetraphenylboron is omitted.

Films are prepared from emulsion Samples Nos. 1 and 2 and Comparative Sample A by pouring the dispersions into 8×21 cm molds and permitting them to dry for 24 hours at ambient conditions. The resulting transparent strips are demolded and hung in a fume hood for an additional 48 hours. At this point the films are about 0.06 cm thick.

The resulting films are evaluated for surface resistivity and static dissipative properties. Before testing, they are conditioned for 90 hours at 12% relative humidity. Surface resistivity is measured by ASTM D-257. The results are as indicated in Table 1 following.

TABLE 1

| Sample No. | Wt. —% Salt [1] | Decay Time [2], sec. | Surface Resistivity, ohms/sq |
|---|---|---|---|
| A* | 0 | 5.24 | $9.5 \times 10^{12}$ |
| 1 | 1 | 0.02 | $1.1 \times 10^{11}$ |
| 2 | 1 | 0.02 | $4.5 \times 10^{10}$ |

*Not an example of this invention.
[1] Based on weight of polymer.
[2] Time required to dissipate 99% of an applied charge of 5000 VDC.

As illustrated by the data in Table 1, the addition of only 1 weight percent salt decreases the static decay time to essentially zero. This demonstrates the unusual effectiveness of the salt in polyurethane-urea formulations. Also of note are the reductions in resistivity, which approximate two orders of magnitude.

EXAMPLE 2

Samples No. 1 and 2 are repeated, substituting in each instance an equal quantity of sodium trifluoromethylsulfonate for the sodium tetraphenyl boron. When the sodium trifluoromethylsulfonate is added to the prepolymer, the resulting film exhibits a static decay time of 0.08 seconds and a surface resistivity of $8.9 \times 10^{11}$ ohms/square. When the sodium trifluoromethylsulfonate is added to the prepolymer, the resulting film exhibits a static decay time of 0.11 seconds and also has a surface resistivity of $8.9 \times 10^{11}$ ohms/square.

EXAMPLE 3

A coated substrate is prepared by coagulating a thin film of an static dissipative polyurethane-urea polymer on a polystyrene film. The polyurethane-urea polymer is prepared in the same manner as Sample No. 1, except it contains 1% by weight sodium trifluoromethylsulfonate in place of sodium tetraphenyl boron. The uncoated polystyrene film has essentially no static dissipative properties. However, the coated substrate dissipates 90% of an applied +5000 volt charge in 1.08 seconds, and 90% of an applied −5000 volt charge in 1.22 seconds. At 50% relative humidity, the coated sample is three orders of magnitude lower in surface resistivity.

What is claimed is:

1. A dispersion of a polyurethane-urea polymer in a continuous aqueous phase, said dispersion containing about 0.1 to about 5 parts by weight of an alkali metal or alkaline earth metal salt of a thiocyanate ion, fluorinated alkyl sulfonate ion or tetraorganoboron ion per 100 parts by weight of polyurethane-urea polymer.

2. The dispersion of claim 1, wherein the polyurethane-urea polymer is a neutralized reaction product of a reaction mixture comprising a polyamine curing agent and an isocyanate-terminated prepolymer.

3. The dispersion of claim 2, wherein said prepolymer is the reaction product of a polyisocyanate, a polyether polyol and a polyol containing an ionic or potentially ionic group.

4. The dispersion of claim 3 wherein said prepolymer contains about 10 to about 150 milliequivalent of ionic groups/100 grams, and said polyol containing an ionic or potentially ionic group is a dihydroxy alkanoic acid.

5. The dispersion of claim 4 wherein the continuous phase is aqueous.

6. The dispersion of claim 1 wherein the salt is a tetraphenyl boron salt or a fluorinated alkyl sulfonate salt.

7. The dispersion of claim 4 wherein the salt is a tetraphenyl boron salt or a fluorinated alkyl sulfonate salt.

8. The dispersion of claim 5 wherein the salt is a tetraphenyl boron salt or a fluorinated alkyl sulfonate salt.

9. The dispersion of claim 2, wherein said prepolymer is the reaction product of a polyisocyanate, a polyester polyol and a polyol containing an ionic or potentially ionic group.

10. A substrate having a static dissipative coating comprising a polyurethane-urea polymer having dispersed therein from about 0.1 to about 5 parts, per 100 parts by weight polymer, of an alkali metal or alkaline earth metal salt of a thiocyanate ion, fluorinated alkyl sulfonate ion or tetraorganoboron ion.

11. The substrate of claim 10 wherein the salt is a tetraphenyl boron salt or a fluorinated alkyl sulfonate salt.

12. The substrate of claim 10 wherein the polyurethane-urea polymer is a neutralized reaction product of a reaction mixture comprising a polyamine curing agent and an isocyanate-terminated prepolymer.

13. The substrate of claim 12 wherein said prepolymer is the reaction product of a polyisocyanate, a polyether polyol and a polyol containing an ionic or potentially ionic group.

14. The substrate of claim 13 wherein said prepolymer contains about 10 to about 150 milliequivalents of ionic groups/100 gram, and said polyol containing an ionic or potentially ionic group is a dihydroxy alkanoic acid.

15. The substrate of claim 12 wherein said prepolymer is the reaction product of a polyisocyanate, a polyester polyol and a polyol containing an ionic or potentially ionic group.

16. A static dissipative polyurethane-urea polymer prepared by coagulating the dispersion of claim 1.

17. A static dissipative polyurethane-urea polymer prepared by coagulating the dispersion of claim 4.

* * * * *